(12) United States Patent
Nordin et al.

(10) Patent No.: US 7,969,320 B2
(45) Date of Patent: Jun. 28, 2011

(54) SYSTEMS AND METHODS FOR DETECTING A PATCH CORD END CONNECTION

(75) Inventors: Ronald A. Nordin, Naperville, IL (US); Brian D. Leshin, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/644,978

(22) Filed: Dec. 22, 2009

(65) Prior Publication Data

US 2010/0090846 A1    Apr. 15, 2010

Related U.S. Application Data

(63) Continuation of application No. 11/462,895, filed on Aug. 7, 2006, now Pat. No. 7,636,050.

(60) Provisional application No. 60/706,029, filed on Aug. 8, 2005.

(51) Int. Cl.
  *G08B 21/00* (2006.01)
  *G01R 3/00* (2006.01)
(52) U.S. Cl. ......... 340/635; 340/644; 340/653; 439/490
(58) Field of Classification Search .................. 340/635, 340/644, 653, 500–502, 505, 514; 361/679.09, 361/679.02, 679.6, 686; 439/488–490; 375/257
See application file for complete search history.

(56) References Cited

U.S. PATENT DOCUMENTS

| | | |
|---|---|---|
| 3,052,842 A | 9/1962 | Frohman et al. |
| 3,573,789 A | 4/1971 | Sharp et al. |
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,196,316 A | 4/1980 | McEowen et al. |
| 4,517,619 A | 5/1985 | Uekubo et al. |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |

(Continued)

FOREIGN PATENT DOCUMENTS

EP    0297079 B1    3/1992

(Continued)

OTHER PUBLICATIONS

Finding the Missing Link, Cabeling Installation & Maintenance, Jun./Jul. 2002, 4 pages.

(Continued)

*Primary Examiner* — Jennifer Mehmood
(74) *Attorney, Agent, or Firm* — Robert A. McCann; Christopher S. Clancy; Christopher K. Marlow

(57) ABSTRACT

Systems and methods for detecting a patch cord connection are presented. The insertion of a patch cord into a device jack physically closes a circuit, thereby permitting determination of the patch cord connection. The connection of only one side of a patch cord to a jack is able to be determined. In addition, a particular jack with which a patch cord is connected is able to be determined.

12 Claims, 2 Drawing Sheets

U.S. PATENT DOCUMENTS

| | | | |
|---|---|---|---|
| 4,901,004 | A | 2/1990 | King |
| 4,937,835 | A | 6/1990 | Omura |
| 5,037,167 | A | 8/1991 | Beaty |
| 5,107,532 | A | 4/1992 | Hansen et al. |
| 5,111,408 | A | 5/1992 | Amjadi |
| 5,145,380 | A | 9/1992 | Holcomb et al. |
| 5,161,988 | A | 11/1992 | Krupka |
| 5,170,327 | A | 12/1992 | Burroughs |
| 5,204,929 | A | 4/1993 | Machall et al. |
| 5,222,164 | A | 6/1993 | Bass, Sr. et al. |
| 5,226,120 | A | 7/1993 | Brown et al. |
| 5,233,501 | A | 8/1993 | Allen et al. |
| 5,265,187 | A | 11/1993 | Morin et al. |
| 5,270,658 | A | 12/1993 | Epstein |
| 5,296,818 | A * | 3/1994 | Vrablec ............ 324/542 |
| 5,305,405 | A | 4/1994 | Emmons et al. |
| 5,312,273 | A | 5/1994 | Andre et al. |
| 5,353,367 | A | 10/1994 | Czosnowski et al. |
| 5,394,503 | A | 2/1995 | Dietz, Jr. et al. |
| 5,394,504 | A | 2/1995 | Burack et al. |
| 5,432,847 | A | 7/1995 | Hill et al. |
| 5,483,467 | A | 1/1996 | Krupka et al. |
| 5,487,666 | A | 1/1996 | DiGiovanni |
| 5,521,902 | A | 5/1996 | Ferguson |
| 5,532,603 | A | 7/1996 | Bottman |
| 5,546,282 | A | 8/1996 | Hill et al. |
| 5,550,755 | A | 8/1996 | Martin et al. |
| 5,583,874 | A | 12/1996 | Smith et al. |
| 5,684,796 | A | 11/1997 | Abidi et al. |
| 5,726,972 | A | 3/1998 | Ferguson |
| 5,727,055 | A | 3/1998 | Ivie et al. |
| 5,754,112 | A | 5/1998 | Novak |
| 5,764,043 | A | 6/1998 | Czosnowski et al. |
| 5,790,041 | A | 8/1998 | Lee |
| 5,832,071 | A | 11/1998 | Voelker |
| 5,847,557 | A | 12/1998 | Fincher et al. |
| 5,854,824 | A | 12/1998 | Bengal et al. |
| 5,870,626 | A | 2/1999 | Lebeau |
| 5,876,240 | A | 3/1999 | Derstine et al. |
| 5,878,030 | A | 3/1999 | Norris |
| 5,892,756 | A | 4/1999 | Murphy |
| 5,898,837 | A | 4/1999 | Guttman et al. |
| 5,915,993 | A | 6/1999 | Belopolsky et al. |
| 5,923,663 | A | 7/1999 | Bontemps et al. |
| 5,944,535 | A | 8/1999 | Bullivant et al. |
| 5,997,311 | A * | 12/1999 | Crouse et al. ............ 439/49 |
| 6,002,331 | A | 12/1999 | Laor |
| 6,041,352 | A | 3/2000 | Burdick et al. |
| 6,067,014 | A | 5/2000 | Wilson |
| 6,078,113 | A | 6/2000 | True et al. |
| 6,086,415 | A | 7/2000 | Sanchez et al. |
| 6,094,261 | A | 7/2000 | Contarino, Jr. |
| 6,175,865 | B1 | 1/2001 | Dove et al. |
| 6,222,908 | B1 | 4/2001 | Bartolutti et al. |
| 6,229,538 | B1 | 5/2001 | McIntyre et al. |
| 6,234,830 | B1 | 5/2001 | Ensz et al. |
| 6,243,510 | B1 | 6/2001 | Rauch |
| 6,244,907 | B1 | 6/2001 | Arnett |
| 6,285,293 | B1 | 9/2001 | German et al. |
| 6,330,307 | B1 | 12/2001 | Bloch et al. |
| 6,350,148 | B1 | 2/2002 | Bartolutti et al. |
| 6,381,283 | B1 | 4/2002 | Bhardwaj et al. |
| 6,421,322 | B1 | 7/2002 | Koziy et al. |
| 6,424,710 | B1 | 7/2002 | Bartolutti et al. |
| 6,434,716 | B1 | 8/2002 | Johnson et al. |
| 6,437,894 | B1 | 8/2002 | Gilbert et al. |
| 6,453,014 | B1 | 9/2002 | Jacobson et al. |
| 6,456,768 | B1 | 9/2002 | Boncek et al. |
| 6,499,861 | B1 | 12/2002 | German et al. |
| 6,522,737 | B1 | 2/2003 | Bartolutti et al. |
| 6,561,827 | B2 | 5/2003 | Früström et al. |
| 6,574,586 | B1 | 6/2003 | David et al. |
| 6,577,243 | B1 | 6/2003 | Dannenmann et al. |
| 6,601,097 | B1 | 7/2003 | Cheston et al. |
| 6,626,697 | B1 | 9/2003 | Martin et al. |
| 6,629,269 | B1 | 9/2003 | Kahkoska |
| 6,684,179 | B1 | 1/2004 | David |
| 6,688,910 | B1 | 2/2004 | Macauley |
| 6,714,698 | B2 | 3/2004 | Pfeiffer et al. |
| 6,725,177 | B2 | 4/2004 | David et al. |
| 6,750,643 | B2 | 6/2004 | Hwang et al. |
| 6,778,911 | B2 | 8/2004 | Opsal et al. |
| 6,784,802 | B1 | 8/2004 | Stanescu |
| 6,788,213 | B2 | 9/2004 | Menard |
| 6,798,944 | B2 | 9/2004 | Pfeiffer et al. |
| 6,802,735 | B2 | 10/2004 | Pepe et al. |
| 6,823,063 | B2 | 11/2004 | Mendoza |
| 6,857,897 | B2 | 2/2005 | Conn |
| 6,871,156 | B2 | 3/2005 | Wallace et al. |
| 6,898,368 | B2 | 5/2005 | Colombo et al. |
| 6,992,491 | B1 | 1/2006 | Lo et al. |
| 6,994,561 | B2 * | 2/2006 | Pepe ............ 439/49 |
| 7,005,861 | B1 | 2/2006 | Lo et al. |
| 7,027,704 | B2 | 4/2006 | Frohlich et al. |
| 7,028,087 | B2 | 4/2006 | Caveney |
| 7,068,043 | B1 | 6/2006 | Lo et al. |
| 7,068,044 | B1 | 6/2006 | Lo et al. |
| 7,153,142 | B2 * | 12/2006 | Shifris et al. ............ 439/49 |
| 7,160,143 | B2 | 1/2007 | David et al. |
| 7,207,846 | B2 | 4/2007 | Caveney et al. |
| 7,234,944 | B2 | 6/2007 | Nordin et al. |
| 7,312,715 | B2 | 12/2007 | Shalts et al. |
| 7,519,003 | B2 | 4/2009 | Koziy et al. |
| 2002/0069277 | A1 | 6/2002 | Caveney |
| 2002/0071394 | A1 | 6/2002 | Koziy et al. |
| 2002/0090858 | A1 | 7/2002 | Caveney |
| 2002/0116485 | A1 | 8/2002 | Black et al. |
| 2003/0061393 | A1 | 3/2003 | Steegmans et al. |
| 2003/0152087 | A1 | 8/2003 | Shahoumian et al. |
| 2004/0052471 | A1 | 3/2004 | Columbo et al. |
| 2004/0065470 | A1 | 4/2004 | Goodison et al. |
| 2004/0073597 | A1 | 4/2004 | Caveney et al. |
| 2004/0077220 | A1 | 4/2004 | Musolf et al. |
| 2004/0219827 | A1 | 11/2004 | David et al. |
| 2005/0111491 | A1 | 5/2005 | Caveney |
| 2005/0136729 | A1 | 6/2005 | Redfield et al. |
| 2005/0141431 | A1 | 6/2005 | Caveney et al. |
| 2005/0195584 | A1 | 9/2005 | AbuGhazaleh et al. |
| 2005/0224585 | A1 | 10/2005 | Durrant et al. |
| 2005/0231325 | A1 | 10/2005 | Durrant et al. |
| 2005/0239339 | A1 | 10/2005 | Pepe |
| 2005/0245127 | A1 | 11/2005 | Nordin et al. |
| 2006/0047800 | A1 | 3/2006 | Caveney et al. |
| 2006/0282529 | A1 | 12/2006 | Nordin |
| 2007/0013487 | A1 * | 1/2007 | Scholtz et al. ............ 340/10.41 |
| 2007/0032124 | A1 | 2/2007 | Nordin et al. |
| 2007/0117444 | A1 | 5/2007 | Caveney et al. |
| 2007/0132503 | A1 | 6/2007 | Nordin |
| 2007/0207666 | A1 | 9/2007 | Caveney et al. |

FOREIGN PATENT DOCUMENTS

| | | |
|---|---|---|
| EP | 0575100 B1 | 4/1998 |
| EP | 0745229 B1 | 3/2003 |
| FR | 2680067 A1 | 1/1991 |
| GB | 2236398 A | 4/1991 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 A2 | 5/2004 |
| WO | 2005072156 A2 | 8/2005 |
| WO | 2006052686 A1 | 5/2006 |

OTHER PUBLICATIONS

IntelliMAC-The New Intelligent Cable Management Solution by iTRACS and NORDX/CDT, Press Release 2003, 2 pages.

RiT Technologies, Ltd. SMART Cabling System, RiT Technologies, Ltd., 2004, 4 pages.

Ortronics Launches iTRACS—Ready Structured Cabling Solutions, News Release, Mar. 7, 2003, 3 pages.

The SYSTIMAX iPatch System—Intelligent Yet Simple Patching Management for the Cabling Infrastructure, CommScope, Inc., 2004, 8 pages.

White Paper—Intelligent Patching, David Wilson, Nov. 2002, 5 pages.
PatchView for the Enterprise (PV4E) Technical Background/Networks for Business, Jun. 24-26, 2003, 3 pages.
RiT Technologies, Ltd. Go Patch-less, May 2000 Edition of Cabling Systems, 4 pages.
Intelligent Cable Management Systems—Hot Topics, Trescray, 2 pages.
Brand-Rex Network Solutions Access Racks Cat 5E6 Cabling UK, 6 pages.
Molex Premise Networks/Western Europe-Real Time Patching System, Molex Premise Networks, 2001, 1 page.
Product of the Week, Molex's Real Time Patching System, 3 pages.
EC&M Taking Note of Patch Panel Technology, Mark McElroy, Jun. 1, 1998, 3 pages.
Intelligent Patching SMARTPatch for the Enterprise (SP4E), 8 pages.

* cited by examiner

SYSTEMS AND METHODS FOR DETECTING A PATCH CORD END CONNECTION

CROSS-REFERENCE TO RELATED APPLICATION

This application is a continuation of U.S. patent application Ser. No. 11/462,895, filed Aug. 7, 2006, now U.S. Pat. No. 7,636,050, which claims the benefit of priority to U.S. Provisional Patent Application Ser. No. 60/706,029, filed Aug. 8, 2005, which is incorporated herein by reference in its entirety. In addition, this application is related to U.S. patent application Ser. No. 11/265,316, filed Nov. 2, 2005, now U.S. Pat. No. 7,297,018, which claims the benefit of priority to U.S. Provisional Patent Application Ser. No. 60/624,753, filed Nov. 3, 2004, both of which are incorporated herein by reference in their entireties.

TECHNICAL FIELD

Related technical fields include patch cord systems.

BACKGROUND

FIGS. 1-3 show the current connecting hardware technology in 9th wire patch cord management systems. 9th wire systems are disclosed for example in U.S. patent application Ser. No. 11/423,826, filed Jun. 13, 2006, which claims the benefit of priority to U.S. Provisional Patent Application Ser. No. 60/690,149, filed Jun. 14, 2005, both of which are incorporated herein by reference in their entirety. As shown in FIG. 1, a typical 9th wire patch cord 150 includes a patch plug 140 that may be inserted into a patch jack 145 of a panel 130. The patch cord also includes a 9th wire 115 connected to a 9th wire cord contact 115. When inserted, the patch plug 140 electrically connects to the patch jack 145, thereby allowing communication from the patch cord 150 to the panel 130. Furthermore, when inserted, the 9th wire cord contact 115 connects to the 9th wire panel contact 120.

As shown in the simplified top views of FIGS. 2 and 3, upon connection, the 9th wire cord contact 115 of the 9th wire 110 may be introduced between a first portion 120a and a second portion 120b of the 9th wire panel contact 120. When introduced, the 9th wire cord contact 115 forms an electrical connection with the 9th wire panel contact 120. As a result of the electrical connection, the 9th wire 110 is electrically connected to a first transceiver 300.

Similarly, as shown in FIG. 3, an opposite end of the 9th wire cord includes a second 9th wire cord contact 116. The second 9th wire cord contact 116 of the 9th wire 110 may be introduced between a first portion 121a and a second portion 121b of a second 9th wire panel contact connected to a second panel 131. When introduced, the second 9th wire cord contact 116 forms an electrical connection with second the 9th wire panel contact. As result of the electrical connection, the 9th wire 110 is electrically connected to a second transceiver 301.

The above systems and methods for determining where each plug of a patch cord is connected rely on the transceivers 300, 301 communicating with each other. Thus, when both plugs 140 of a patch cord 150 are inserted their respective panels 130, 131, an electrical circuit is formed and the transceivers 300, 301 can communicate with each other. When either plug 140 of a patch cord 150 is removed from its corresponding patch jack 145, the $9^{th}$ wire circuit is broken and the transceivers 300, 301 cannot communicate with each other. As a result, the only conclusions the system can make are that both plugs of a patch cord have been installed or that one end of a patch cord has been removed.

Some conventional systems and methods for determining whether a patch cord is connected have attempted to use complicated plug sensors such as electromagnetic radiation (visible light) transceivers, magnetic detectors, code reading sensors, and physical sensors. See, for example, U.S. Pat. Nos. 6,424,710; 6,222,908; 6,285,293; and 6,350,148. However, these systems rely on non-electrical sensors and are not for use with 9th wire patch cord systems.

SUMMARY

The above systems and methods for determining whether a patch cord is connected have at least one or more of the following problems. First, the system cannot electrically detect when only one side (plug) of a previously un-connected patch cord is inserted into a jack. Second, the system cannot electrically detect when both sides of a previously connected patch cord have been removed.

Accordingly, it is beneficial to provide systems and methods for detecting a patch cord connection that can simply and reliably determine the above and in addition determine when only one side of a patch cord is connected to a jack.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
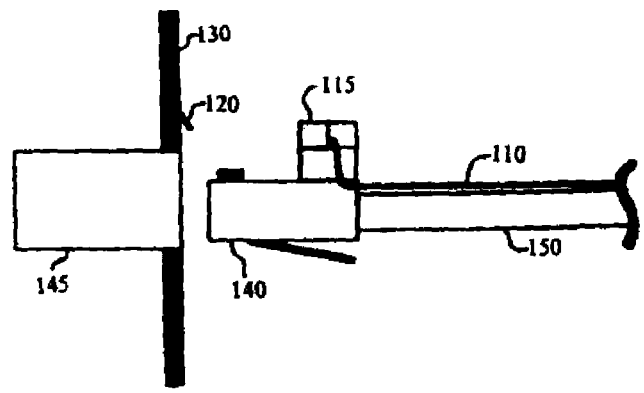
FIG. 1 shows an example of a conventional patch cord and panel.
Figure 2:
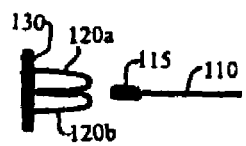
FIG. 2 shows a simplified top view of a conventional 9th wire and 9th wire panel contact.
Figure 3:
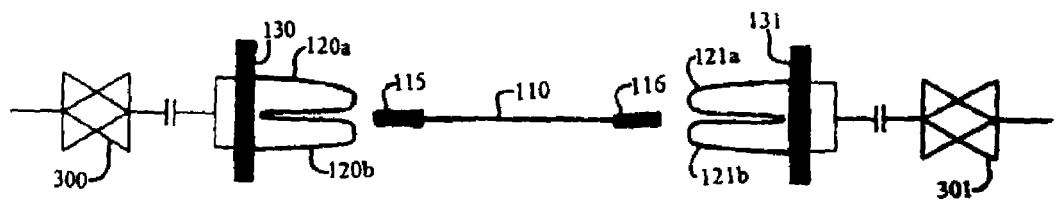
FIG. 3 shows a simplified top view of a conventional 9th wire and two 9th wire panel contacts.
Figure 4:
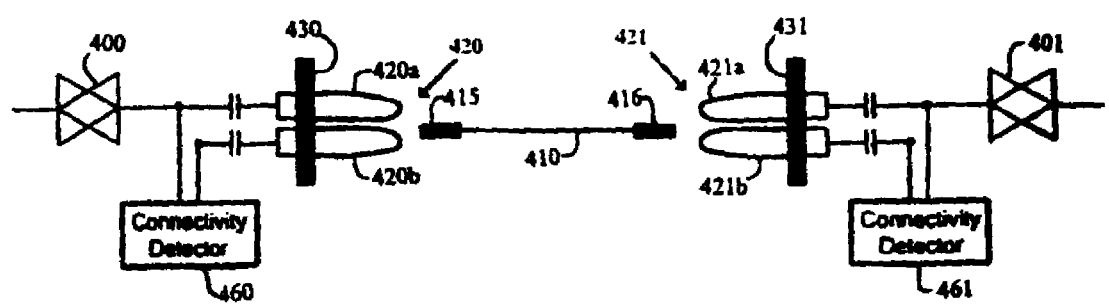
FIG. 4 shows a simplified top view of an exemplary 9th wire connection detection system.

FIG. 4 shows a simplified top view of an exemplary 9th wire connection detection system according to an exemplary implementation of the principles described herein. For convenience, only the 9th wire and associated 9th wire panel contacts are shown; the general patch cord, including the patch plug, is not shown. As shown in FIG. 4, the 9th wire 410 terminates with a first and a second 9th wire cord contact 415, 416. Each of the 9th wire panel contacts 420, 421 have two portions, a first portion 420a and a second portion 420b for the first 9th wire panel contact 420 and a first portion 421a and a second portion 421b for the second 9th wire panel contact 421. Unlike the above 9th wire system shown in FIGS. 1-3, the first and second portions 420a, 420b of the first 9th wire panel contact 420 are normally electrically isolated from each other. Similarly, the second portions 421a and 421b of the second 9th wire panel contact 421 are normally electrically isolated from each other. The electrical isolation may occur from a physical separation between each first portion 420a, 421a and the corresponding second portion 420b, 421b.

Each of the first portions 420*a*, 421*a* are electrically connected to respective connectivity detectors 460, 461. Similarly, each of the second portions 420*b* and 421*b* are electrically connected to the respective connectivity detectors 460, 461. As a result each panel 430, 431 of the 9th wire system contains an open circuit. For example, the first panel 430 includes an open circuit beginning at the first portion 420*a* of the first 9th wire panel contact. As shown in FIG. 4, the circuit continues to the connectivity detector 460 and returns to the second portion 420*b* of the first 9th wire panel contact.

As a result of the 9th wire panel contact's location, when a patch plug of a patch cord is inserted into a jack, the 9th wire cord contact, e.g., 9th wire cord contact 415 shown in FIG. 4, is introduced between the first portion 420*a* and second portion 420*b* of the 9th wire panel contact. It should be appreciated that the 9th wire cord contact 415 may be made from any suitable electrically conductive material. As a result of the 9th wire cord contact 415 being introduced between the first portion 420*a* and second portion 420*b* of the 9th wire panel contact 420, the circuit including the first portion 420*a*, the second portion 420*b*, and the connectivity detector 460 of the panel 430 is closed.

Each of the connectivity detectors 460, 461 is capable of detecting the open or closed nature of their respective circuits. Thus, when a 9th wire cord contact 415, 416 is introduced between the respective portions 420*a*, 420*b*, 421*a*, 421*b* of their respective 9th wire panel contacts, the connectivity detectors will detect that the circuit has been closed. When a connectivity detector 460, 461 detects that a circuit is closed, it concludes that a patch plug has been inserted into its corresponding patch jack. For example, one or more of the connectivity detectors 460, 461 may be connected to a controller (not shown) that monitors the status of each connectivity detector 460, 461 to determine whether or not a patch plug has been inserted into the patch jack that the connectivity detector 460, 461 is monitoring. Alternatively, one or more of the connectivity detectors 460, 461 may be combined into a single connectivity detector capable of monitoring a plurality of circuits.

Furthermore, the exemplary system is also capable of determining whether both ends of a patch cord are plugged into patch jacks. As shown in FIG. 4, one of the portions of each 9th wire panel contact (420*a* and 420*b* in FIG. 4) may be connected to transceivers 400, 401. One or more of the transceivers may be connected to a controller (not shown). When, for example, the transceiver 400 is capable of communicating with the transceiver 401, it may be determined that one end of a patch cord is inserted into the patch jack corresponding to the transceiver 400 and the other end of the patch cord is inserted into the patch jack corresponding to the transceiver 401.

Figure 5:
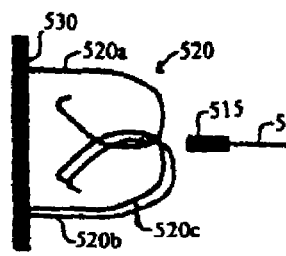
FIG. 5 shows a simplified top view of an exemplary 9th wire and 9th wire panel contact.
Figure 6:
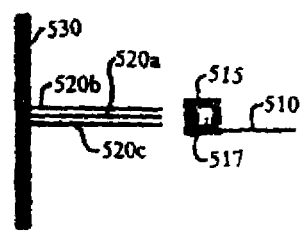
FIG. 6 shows a simplified side view of an exemplary 9th wire and 9th wire panel contact.
Figure 7:
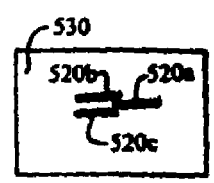
FIG. 7 shows a simplified front view of an exemplary 9th wire panel contact.

FIGS. 5-7 show an exemplary structure of a 9th wire panel contact 520 and 9th wire cord contact 515. FIG. 5 shows the 9th wire panel contact 520 and 9th wire cord contact 515 from above, FIG. 6 shows the 9th wire panel contact 520 and 9th wire cord contact 515 from the side, and FIG. 7 shows the 9th wire panel contact 520 from the front.

As shown in FIGS. 5-7, the exemplary 9th wire panel contact 520 may include a first portion 520*a*, a second portion 520*b*, and a third portion 520*c*. Each of the first portion 520*a*, second portion 520*b*, and third portion 520*c* may be arranged such that when viewed from the front or side (FIGS. 6 and 7) the first portion 520*a* may be located between the second portion 520*b* and third portion 520*c*, and each of the first portion 520*a*, second portion 520*b*, and third portion 520*c* may be substantially parallel. As used herein, the term "substantially parallel" is intended to encompass all orientations of the portions 520*a*, 520*b*, 520*c* in which the first portion 520*a*, second portion 520*b*, and third portion 520*c* do not touch one another. Accordingly, an orientation in which the first portion 520*a*, second portion 520*b*, and third portion 520*c* are not geometrically parallel, but are not touching is contemplated by the term "substantially parallel."

Furthermore, as shown in FIGS. 5 and 7, when viewed from above, the first portion 520*a* may intersect and/or cross the second portion 520*b* and/or third portion 520*c*. Thus, when the portions 520*a*, 520*b*, 520*c* are made from a resilient conductive material, such as metal wire, and a 9th wire contact 515 is introduced between the portions 520*a*, 520*b*, 520*c*, thereby separating the portions 520*a*, 520*b*, 520*c*. The portions 520*a*, 520*b*, 520*c*, in turn, exert an inward force against the surface of the 9th wire contact 515, thereby ensuring an electrical connection.

As shown in FIG. 5, the 9th wire contact 515 may be thin when viewed from above to facilitate the 9th wire contact 515 being inserted between the portions 520*a* and the portions 520*b*, 520*c*. Furthermore, as shown in FIG. 6, the 9th wire contact may be tall enough to effectively contact each of the portions 520*a*, 520*b*, 520*c*.

The 9th wire contact 515 may include a hole or indentation 517 in which the curved overlapping sections of the portions 520*a*, 520*b*, 520*c* may nestle within. As a result of the curved overlapping sections of the portions 520*a*, 520*b*, 520*c* nestling within the hole or indentation 517, the curved overlapping sections of the portions 520*a*, 520*b*, 520*c* resist longitudinal motion of the 9th wire contact 515. Accordingly, the curved overlapping sections of the portions 520*a*, 520*b*, 520*c* may resist the 9th wire contact 515 from being accidentally inserted too far into the 9th wire panel contact, or being accidentally removed from the 9th wire panel contact without the corresponding patch plug being removed form the patch jack.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, although exemplary configurations of the 9th wire panel contact and the 9th wire contact are set forth above, different configurations, including those now known and later developed, may be used as long as the 9th wire contact, or any other portion of the patch cord, is configured to close an open in a circuit that exists as a result of the configuration of the 9th wire panel contact.

Furthermore, although the examples shown in FIGS. 4-7 utilize two or three portions of the 9th wire panel contact, more than three portions may be used as well.

The above examples focus on 9th wire patch cord systems; however, the broad principles described above are applicable to patch cords having any number of wires. For example, an eight-wire patch cord may be used in conjunction with a conductive member attached to the jack that may complete an open circuit that exists as a result of the configuration of a panel contact.

We claim:

1. A patch cord system comprising:
a patch cord containing a 9th wire disposed between 9th wire cord contacts; and
a plurality of panels each containing a 9th wire panel contact adapted to accept one of the 9th wire cord contacts, the 9th wire panel contact including first and second portions isolated from each other when the 9th wire cord contact is not disposed therebetween and in electrical contact with each other when the 9th wire cord contact is disposed therebetween.

2. The patch cord system of claim 1 further comprising a connectivity detector connected between the first and second portions of at least one of the panels, the connectivity detector adapted to detect electrical contact between the first and second portions of the 9th wire panel contact of the at least one of the panels.

3. The patch cord system of claim 2 wherein each panel has a separate connectivity detector associated therewith.

4. The patch cord system of claim 1 further comprising a transceiver connected to each panel, the transceivers connected to each other through the patch cord when the patch cord is connected between the panels.

5. The patch cord system of claim 1 wherein the first and second portions comprise a resilient conductive material and are disposed such that the first and second portions exert an inward force against the 9th wire cord contact when the 9th wire cord contact is inserted therebetween.

6. The patch cord system of claim 1 wherein the 9th wire panel contact further comprises a third portion, the first portion disposed between the second portion and third portion.

7. The patch cord system of claim 6 wherein the first, second, and third portions are substantially parallel.

8. The patch cord system of claim 6 wherein the third portion is adjacent to the second portion in a first direction and the second and third portions are adjacent to the first portion in a second direction.

9. The patch cord system of claim 8 wherein the first portion overlaps at least one of the second and third portions in the first direction.

10. The patch cord system of claim 8 wherein the 9th wire cord contact contacts each of the first, second, and third portions when the 9th wire cord contact is inserted into the 9th wire panel contact.

11. The patch cord system of claim 1 wherein the 9th wire cord contact comprises a hole in which the first and second portions are disposed within when the 9th wire cord contact is inserted into the 9th wire panel contact.

12. The patch cord system of claim 11 wherein the first and second portions comprise curved sections disposed such that the curved sections of the first and second portions are disposed within the hole when the 9th wire cord contact is inserted into the 9th wire panel contact.

\* \* \* \* \*